US008016203B2

(12) United States Patent
Chamley et al.

(10) Patent No.: US 8,016,203 B2
(45) Date of Patent: Sep. 13, 2011

(54) SMARTCARD, TELEPHONE COMPRISING SUCH A CARD AND METHOD FOR EXECUTING A COMMAND IN SUCH A CARD

(75) Inventors: Olivier Chamley, Leognan (FR); Lorenzo Stranges, Neuilly sur Seine (FR)

(73) Assignee: Oberthur Technologies, Levallois-Perret (FR)

( * ) Notice: Subject to any disclaimer, the term of this patent is extended or adjusted under 35 U.S.C. 154(b) by 0 days.

(21) Appl. No.: 12/270,243

(22) Filed: Nov. 13, 2008

(65) Prior Publication Data

US 2009/0134212 A1 May 28, 2009

(30) Foreign Application Priority Data

Nov. 13, 2007 (FR) ...................................... 07 59009

(51) Int. Cl.
*G06K 19/06* (2006.01)
(52) U.S. Cl. ...................................................... 235/492
(58) Field of Classification Search .................. 235/492, 235/375, 487, 493; 340/5.24, 5.23
See application file for complete search history.

(56) References Cited

U.S. PATENT DOCUMENTS

| 5,049,728 | A | | 9/1991 | Rovin | |
|---|---|---|---|---|---|
| 5,838,059 | A | * | 11/1998 | Inoue et al. | 257/679 |
| 5,847,372 | A | * | 12/1998 | Kreft | 235/492 |
| 7,337,326 | B2 | * | 2/2008 | Palmer et al. | 713/186 |
| 2003/0140245 | A1 | * | 7/2003 | Dahan et al. | 713/200 |
| 2007/0145135 | A1 | * | 6/2007 | Jogand-Coulomb et al. | 235/451 |

FOREIGN PATENT DOCUMENTS

| DE | 44 06 704 | 7/1995 |
|---|---|---|
| DE | 196 18 103 | 11/1997 |
| EP | 0 534 559 | 3/1993 |
| EP | 0 779 598 | 6/1997 |
| EP | 1 280 066 | 1/2003 |
| EP | 1 603 088 | 12/2005 |
| FR | 2 893 803 | 5/2007 |

OTHER PUBLICATIONS

Urien, P., "Internet card, a smart card as a true Internet node", Computer Communications, Elsevier Science Publishers BV, Amsterdam, NL, vol. 23, No. 17, Nov. 1, 2000, XP004238469, ISSN: 0140-3664, pp. 1655-1666.

(Continued)

*Primary Examiner* — Daniel Hess
*Assistant Examiner* — Tabitha Chedekel
(74) *Attorney, Agent, or Firm* — Young & Thompson

(57) ABSTRACT

A smartcard (1) includes:
a first and a second microprocessor (110, 210),
elements for receiving (14) commands each coming from a first or a second communications channel external to the card (1) and for transmitting the received commands to the first microprocessor, characterized in that the first microprocessor includes elements for determining (706) whether a received command has been received on the second communications channel so as to transmit (708) the received command to the second microprocessor (210) in the case of a positive determination. Notably, the determination can be carried out by detecting an electrical contact of the communications interface of the card, over which the command is received. Application of the invention to a card having a second microprocessor for executing a highly securitized application, of the banking transaction type, and a first less securitized application, of the mobile telephony application type.

20 Claims, 4 Drawing Sheets

OTHER PUBLICATIONS

Khachtchanski V. I. et al. "Universal SIM Toolkit-based client for mobile authorization system", International Conference on Information Integration and Web-Based Applications and Services, XX, XX, Sep. 10, 2001, XP002282125, pp. 337-344.

"NFC Forum—Frequent Asked Questions" Internet Citation, [Online] XP007900764 Extrait de l'Internet: URL:http://www.nfc-forum.org/aboutnfc/faqs/_28-06-2006> [extrait le Jun. 28, 2006] *le document en eniter*.

"Mithoren und/oder Beeinflussen des SWP" Research Disclosure, Mason Publications, Hampshire, GB, vol. 520, No. 12, Aug. 1, 2007, XP007137523, ISSN: 0374-4353, pp. 824.

Search Report dated Jun. 23, 2008, from corresponding French Application.

* cited by examiner

SMARTCARD, TELEPHONE COMPRISING SUCH A CARD AND METHOD FOR EXECUTING A COMMAND IN SUCH A CARD

The present invention relates to a smartcard. It is more particularly applicable to smartcards according to the ISO 7816 and to smartcards according to the MMC (acronym for "MultiMedia Card") standard. The invention also relates to a mobile telephone comprising such a card and a method for executing a command on such a card.

Some smartcards can comprise several applications, stored in non-volatile memory, for example in a ROM or EEPROM memory, in other words the internal microprocessor or microprocessors have available, in memory, executable (or interpretable) codes for several computer program applications and is/are designed to execute them in order to accomplish a task or to fulfill a particular function.

It may, for example, be envisioned that a first default application is a mobile telephony application, if the system is a mobile telephony card designed for a mobile telephone, and that a second application is a banking application used in an occasional manner, for example, in order to make a payment by means of the telephone. This can notably allow the smartcard to comply, for example, with both a mobile telephony standard (for example, a GSM [acronym for "Global System for Mobile Communications"] standard or ETSI [acronym for "European Telecommunications Standards Institute"] standard) and with a banking standard (for example EMV [acronym for "Europay Mastercard Visa"]).

It is also common for these applications to receive data and commands from several external communications channels connected to the card, for example via a first connection by contact and via a second wireless connection.

Hybrid smartcards already implement this configuration by means of two independent microprocessors each connected to its own connection interface.

Such a solution is relatively costly because each of the microprocessors is dedicated and equipped with its own means of communication.

Furthermore, it is difficult for two applications executed on each of the independent microprocessors to exchange data with one another since they are not interconnected. The data must then transit via the outside of the card between the two communications interfaces. There then exists a security risk for this data since it is exposed to unscrupulous actions outside of the card.

Thus, for many applications, it is preferable to have interconnected microprocessors in the card in order to enable the direct exchange of data and thus to enhance the security of the applications.

Furthermore, it is known that smartcard readers are generally designed to read a smartcard via contacts provided for this purpose on the surface of the smartcard whose function is generally pre-determined and does not change over the lifetime of the reader. There is therefore an interest in developing smartcards starting from conventional smartcards while keeping the communications interface, typically electrical contacts, unchanged. By starting from existing solutions, the fabrication costs are also reduced.

Indeed, in order to adapt to a new function for a contact, it is generally necessary to modify the electronics of the reader, which is not feasible (at a reasonable cost) for the general public using these readers.

Moreover, in the specific case of the ISO 7816 standard, the number of contacts is limited to 8, five of which are used for the protocol according to the ISO 7816 standard (c1, c2, c3, c5, c7), and two of which may be used by a high-speed USB protocol (for example c4 and c8) or three in the case of an MMC protocol. There is therefore a limitation in the capacity for development of smartcards with a view to accommodating other processors.

The interface of the conventional cards is therefore reused for receiving the commands destined for the microprocessors. The result of this is that the first processor, coming from the conventional smartcard, receives all of the commands and data carried via the communications interface.

A common desire is to store and execute two independent and autonomous applications on the same card. Two applications can be independent in the sense that their respective codes do not call upon commands or data specific to the other application. They then exhibit an independent execution.

For software engineering, fabrication and/or certification reasons, it does not turn out to be practical to define, in the first application, a reference to the second application or the commands that the second application accepts. If this were the case, the code for the first application would then be dependent on the second application. It would then become extremely complex and costly in modifications to the first application if it were desired to modify or to replace the second application, or even to add a third application.

The invention aims notably to overcome these drawbacks by providing a smartcard that determines the assignment of the commands received with respect to an application, notably a preponderant one in the sense that the latter processes all the commands received by the smartcard, according to the communications channel over which the command is received.

For this purpose, a subject of the invention is notably a smartcard comprising:
  a first and a second microprocessor,
  means for receiving commands each coming from a first or a second communications channel external to the card and for transmitting said received commands to said first microprocessor,
characterized in that the first microprocessor comprises means for determining whether a received command has been received on the second communications channel so as to transmit said received command to the second microprocessor in the case of a positive determination.

Thus, despite the presence of a preponderant microprocessor, it is possible to assign commands, notably received over a dedicated communications channel, to the relevant microprocessor.

According to one embodiment, the receiving means comprise an interface of electrical contacts designed to receive said commands, the electrical contacts being different ones for each of the two communications channels. Determination means are therefore designed to detect the electrical contact or contacts receiving said command.

The detection can thus readily be implemented because it depends on electrical properties that are commonly known and understood.

Furthermore, by having only one interface of electrical contacts for forming the connection with the two communications channels, such cards can be developed starting from conventional smartcards by simply adding a second microprocessor. The first microprocessor then directs the received commands. It is thus possible to use standard microchips as a second microprocessor, for example with an ISO 7816 interface, without requiring addition communications contacts. The first microprocessor can then be designed to convert received commands from the received format into the format compatible with this second microprocessor before transmitting them to the latter.

In particular, said electrical contacts are exclusively connected to the first microprocessor. A card can thus be fabricated with two microprocessors starting from conventional smartcards.

According to another particular feature, said electrical contacts are provided on one face of a module printed circuit (for example a microprocessor module, also referred to as microchip) and at least one microprocessor is mounted on the other face of said module printed circuit.

Thanks to these dispositions, a robust mechanical protection for the microprocessor or microprocessors is obtained.

According to another particular feature, at least some of the electrical contacts are flush with the card surface. A contact card reader is then used.

In one embodiment, the receiving means comprise means of communication with a wireless communications interface of a card reader, on the electrical contacts of the second channel. This wireless communications interface can be provided by the equipment receiving the card, subject of the invention, for example a mobile telephone.

In particular, said means of communication comply with the NFC (acronym for "Near-Field Communication") standard. Thus, using a mobile telephone equipped with such means of communication, a payment can be processed with an existing payment microprocessor, already certified according to the common criteria. Notably, a single contact may be used for receiving the commands from the second channel.

Equally, it may be envisioned that said means of communication implement an SWP (acronym for "Single Wire Protocol") communications protocol with the card, notably with the first microcircuit or the first application.

According to one alternative to the wireless communications interface, the receiving means comprise means for communicating with a communications interface according to the USB (acronym for "Universal Serial Bus") standard, on the electrical contacts of the second channel.

In one embodiment, the first microprocessor comprises means for converting said received command according to a command format compatible with said second microprocessor, for example a command received according to the SWP protocol via a short-range wireless communications interface connected to the card into an APDU command.

In one embodiment, the first and second microprocessors are designed for the respective execution of a first and of a second application stored in the card. For example, each of the applications can be an operating system onboard the microchip corresponding to the microprocessor.

It is also observed that, in some cases, the smartcards comprise both an application with high security demands and an application with moderate security requirements.

Typically, the applications with high security demands are, for example, applications for payment or for holder identification (passport, identity card). For these applications, clients demand a high level of security that requires particularly long and costly evaluations, for example according to the common criteria, carried out by a certified independent body. Certain evaluations may last over a year and cost several tens of thousands of euros for one model of smartcard. Generally speaking, an evaluation, which could be streamlined, must again be carried out when the application is upgraded or modified.

Applications with moderate security requirements are, for example, mobile telephony applications (for example for identifying a subscriber to a mobile telephony network) or transport applications (for example, access to a public transport network). These applications do not generally require certification or require a much shorter and much less costly certification procedure than the previous examples.

By sharing these two applications between two separate microprocessors in one card according to the invention, a smartcard reader can send commands to both microprocessors without having to implement additional contacts with respect to the case where only one microprocessor is controlled.

Furthermore, the security of the first and second microprocessors can be independently certified. It is thus avoided that the microprocessor with moderate security requirements and the corresponding application are evaluated according to the same criteria as applications with high security demands, a procedure which would involve costs and long delays.

In one embodiment, the card comprises at least one input/output line, preferably according to the ISO 7816 standard, which connects the two microprocessors and is used to transmit said received command between the two microprocessors.

Notably, a clock link is provided which connects the two microprocessors in such a manner that said first microprocessor supplies a clock signal to the second microprocessor, notably according to the ISO 7816 standard. It is recalled that the clock signal according to the ISO 7816 standard corresponds to the contact c3 of the standard.

Thanks to these dispositions, the two microprocessors can operate with different clocks, for example with timings according to different clock frequencies.

According to particular features, the first microprocessor comprises means for inhibiting said clock signal supplied to the second microprocessor.

Thanks to these dispositions, in the case where the second microprocessor comprises means for going into standby in the absence of a clock signal, in order notably to conserve the power supplied by the reader, which can be particularly critical when the reader is in a portable device powered by a battery, such as a mobile telephone, the first microprocessor can control the standby mode of all or a part of the second microprocessor.

In one embodiment, said two microprocessors are mounted on the same module printed circuit (or microchip). This results in an enhanced simplification of the independent certification of the two microprocessors, with a view notably to obtaining a highly securitized microprocessor.

According to one variant, the card comprises a card body and a module printed circuit accommodated by the body, said first and second microprocessors being respectively provided on said module printed circuit and in said body, and interconnected via conducting tracks provided in the card body.

It is notably chosen for the first microprocessor to implement a lower level of security than the second microprocessor.

Thanks to these dispositions, a smartcard reader only implementing the security level of the first microprocessor can control the operation of the second microprocessor. Moreover, the second microprocessor can have its security enhanced owing to the fact that it receives its commands only from the first microprocessor.

Conventionally, the receiving means are designed to transmit outside of the card responses to the received commands. Bi-directional communications are thus established with the card, notably for carrying out transactions.

It has previously been seen that, thanks to the invention, the same electrical contacts are used as for the cards comprising only one application. In order to enable efficient bi-directional communications with the second microprocessor (or second application), the first microprocessor (or first application) is designed to pick up the responses from the second microprocessor prior to transmitting them outside of the card.

Notably, the communications between the microprocessors and their applications can be effected by means of APDU (acronym for "Application Protocol Data Unit") commands.

According to one embodiment, said first microprocessor implements an application according to a mobile telephony standard, notably an application for identifying a subscriber to a mobile telephony network.

According to one variant, said first microprocessor implements a smartcard web server, also written as SCWS.

In one embodiment, said second microprocessor implements a payment application, notably according to the EMV (acronym for "Europay Mastercard Visa") standard.

The smartcard is also designed to comply with the ISO 7816 standard and/or the MMC (acronym for "MultiMedia Card") standard.

According to one possible feature of the invention, the smartcard is of the SIM (acronym for "Subscriber Identification Module") or USIM (acronym for "Universal Subscriber Identification Module") type.

According to another possible feature of the invention, the card complies with the ID-000 format according to the ISO 7816 standard.

Another subject of the invention is a device comprising a smartcard such as is presented hereinabove. In particular, this device may be a terminal, a host station or else a reader; for example, a mobile telephone or a personal computer.

In particular, the device or mobile telephone can comprise
  a card reader designed to communicate with said receiving means, and
  a short-range wireless communications interface connected to said card reader for transmitting said commands from the second communications channel to the card.

Conventionally, the device or mobile telephone can also comprise a communications interface with a mobile telephony network, connected to said card reader so as to transmit said commands from the first communications channel to the card. In this case, the first communications channel can be the mobile telephony network.

Nevertheless, it is noted here that the first communications channel may equally be the device or mobile telephone that generates, for example during the execution of one of its own applications, commands destined for the card.

Another subject of the invention is a method for executing a command by a smartcard comprising a first and a second microprocessor, and means for receiving commands each coming from a first or from a second communications channel external to the card, the method comprising the following steps:
  receive, by a first microprocessor, a command from outside the card,
  upon receiving it, determine whether the received command has been received over the second communications channel,
  in the case of a positive determination, transmit said received command to the second microprocessor.

Optionally, the method may implement means relating to the smartcard features presented hereinabove.

Notably, the receiving means can comprise electrical contacts designed to receive said commands and the determination comprises the detection of the electrical contact or contacts receiving said command.

Equally, in the case of a positive determination, the method can comprise a step for transmission, by said first microprocessor and upon a command from the second microprocessor, outside of the card of at least one response to the received command.

In one embodiment, in the case of a positive determination, the method comprises a step for converting said received command into a format compatible with said second microprocessor, said conversion step being prior to said transmission step.

Since the advantages, objectives and particular features of this method, and of this telephone and of this process for bringing to market are similar to those of the card, subject of the present invention, such as is succinctly described hereinabove, they are not recalled here.

Other advantages, objectives and particular features of the present invention will become apparent from the description that follows, presented by way of non-limiting explanation with reference to the appended drawings, in which.

Figure 1:
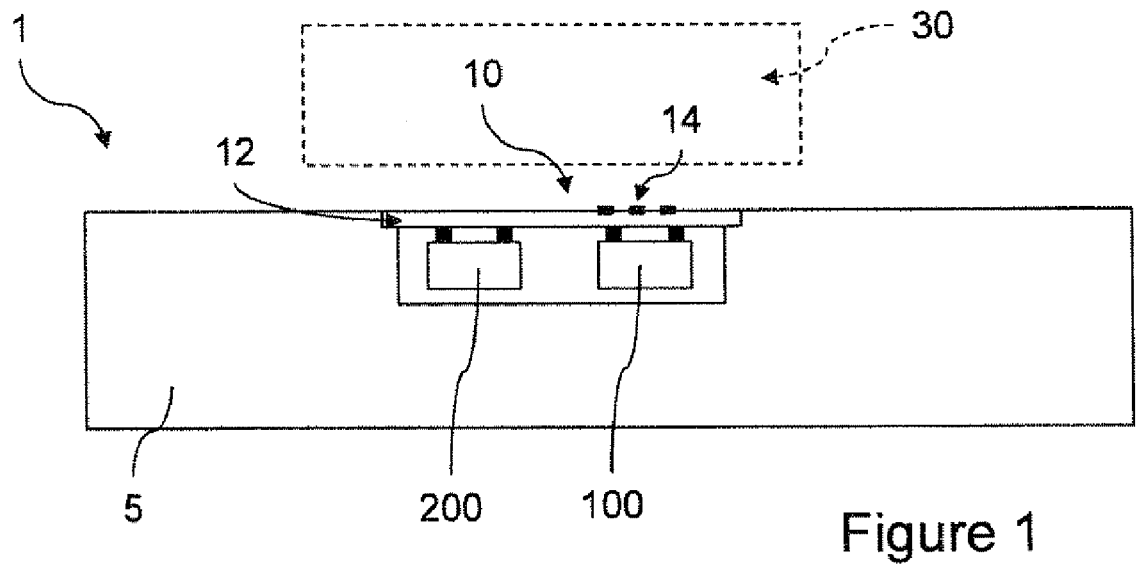
FIG. 1 shows schematically a first embodiment of the invention.

In FIG. 1 can be seen a smartcard 1 comprising a plastic substrate 5 forming card body and an electronic module 10 integrated into the card body.

The electronic module 10 is formed from a printed circuit 12 and from electrical contacts 14 provided on the exterior face of the circuit 12 and designed to be connected to a reader 30, notably eight flush contacts c1 to c8 according to the ISO 7816 standard, and a first microcircuit 100 and a second microcircuit 200 integrated onto the internal face of the circuit 12 in such a manner as to provide a mechanical protection for the latter. The two microcircuits 100 and 200 are connected by means of the printed circuit 12, thanks notably to conducting tracks provided on this circuit and connections between these tracks and the integrated circuit (microcircuit) 100 and 200.

The electrical contacts 14 are only connected to the first microcircuit 100.

The first microcircuit 100 comprises a first microprocessor 110 associated with a first memory storing executable (or interpretable) code instructions of a first application 120. The second microcircuit 200 comprises a second microprocessor 210 associated with a second memory storing executable (or interpretable) code instructions of a second application 220. For example, each of the microcircuits 100 and 200 is a microcontroller comprising a microprocessor and a memory.

Preferably, by means of the first and second applications, the first microprocessor 110 implements a level of security lower than the second microprocessor 210. For example, the first application is an application for identification of a subscriber to a mobile telephony network, called SIM (acronym for "Subscriber Identification Module") and the second application is a banking payment application, for example according to the EMV (acronym for "Europay Mastercard Visa") standard. As a variant, the microprocessor 110 is more secure than the microprocessor 210.

It is recalled here that levels of security are well known to those skilled in the art. In particular, microprocessors and banking applications are generally certified according to the common criteria method (corresponding to the ISO 15408 standard) at a higher or equal level to EAL4 (acronym for "Evaluation Assurance Level 4"), typically at the level EAL4+. In contrast, the microprocessors and mobile telephony applications are not generally certified according to the common criteria. This is explained by the fact that, in the field of mobile telephony, there are less severe demands in terms of securitization, and more severe demands in terms of response time of the card, than in the payment field.

The card reader 30 is a mobile telephone in the case where the first application is a mobile telephony application.

A first internal (input/output) link connects the two microprocessors 110 and 210 together and enables the exchange of information between them. Preferably, information exchanges taking place over the internal link comply with the ISO 7816 standard. Where necessary, the first microprocessor 110 connected to the contacts 14 can be designed to carry out a format conversion on the data received on the contacts into an ISO 7816 format destined for the other microprocessor 210 (and vice versa in the other direction of communication).

A second internal (clock) link carries a clock signal from the first microprocessor 110 to the second microprocessor 210, allowing the first to drive or to inhibit the operation of the second. A third internal link (reset) carries a signal for setting to zero, from the first microprocessor 110 to the second microprocessor 210, allowing the first to control the reset of the second.

In other embodiments, the first microprocessor 110 comprises receiving means complying with a protocol for communicating with a wireless communications interface according to the SWP (Single Wire Protocol) communications protocol.

Figure 2:
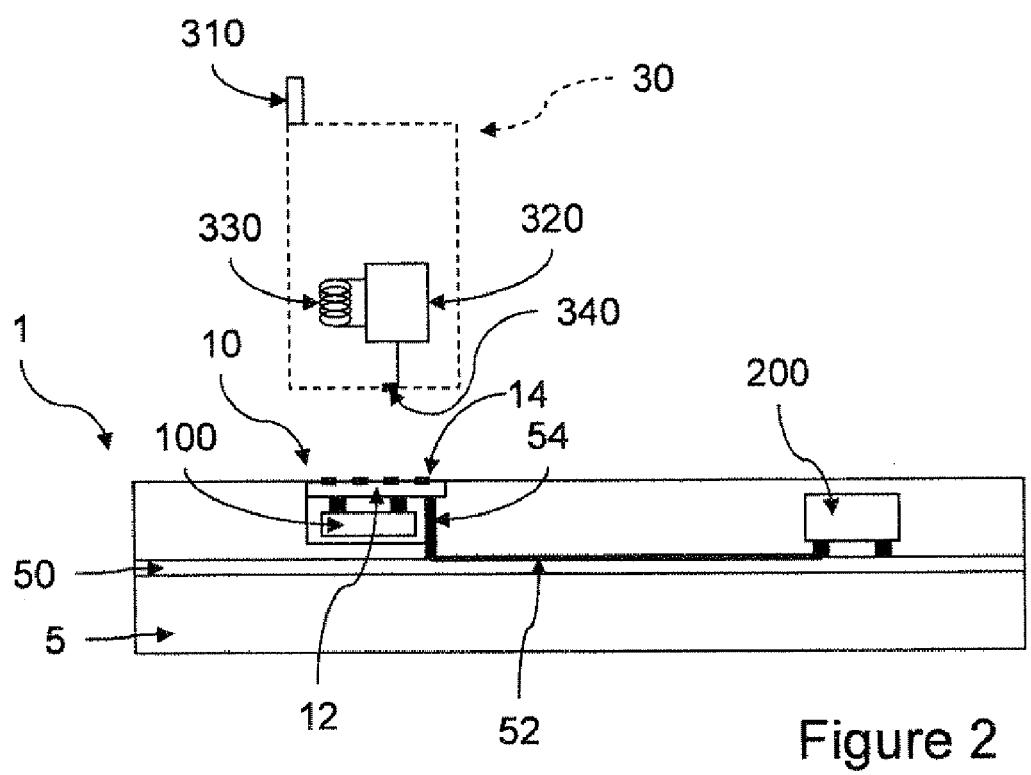
FIG. 2 shows schematically a second embodiment of the invention.

In FIG. 2 can be seen a card 1 having elements in common with the card in FIG. 1.

In FIG. 2, the electronic module 10 only accommodates the first microcircuit 100.

The second microcircuit 200 is integrated into the card body 5 at an intermediate layer level 50 according to a flipchip process.

The two microcircuits 100 and 200 are connected via a conducting track 52 deposited on the layer 50 during the fabrication process. A metalized hole 54 in the first microcircuit 100 allows the latter to be electrically connected to the conducting track 52.

It is furthermore observed that the reader 30 is composed of a mobile telephone equipped with an antenna 310 and with an interface circuit 320. The interface circuit 320 is of the very-short-range type, for example according to the NFC standard, is equipped with an interface antenna 330 and is connected to a contact 340 designed to communicate with one of the contacts 14 on the card 1, for example the contact c4.

An external reader (not shown) equipped with a very-short-range communications interface, for example according to the NFC standard, communicates with the mobile telephone 30 via the interface 320.

It is noted here that the contact c4 used for the wireless communication is different from the other contacts used for communication by contact, in order notably to facilitate the differentiation of the data arrival channels.

"Very short range" is understood to mean a range of less than 1 meter, preferable less than 50 cm, typically less than 20 cm. These could be means of communication for example according to the NFC (acronym for "Near Field Communication") standard or to the ISO (acronym for "International Standards Organization") 14443 standard relating to radiofrequency identification (or RFID), without the invention being limited to these protocols.

One advantage of the very short range is notably to allow a user to initiate, voluntarily or consciously, wireless communications by bringing a portable device up to a fixed reader, typically to a distance of a few centimeters. For example, in the case of a contactless payment smartcard, for example with dimensions according to the ISO 7816 standard, such a range limits the risks of the card holder's account being debited without the holder having expressed his wish to do this by placing his card at a few centimeters from an appropriate reader, and by thus initiating a payment transaction between the reader and his card.

In the case of applications with high security demands, for example transaction or payment applications, the external reader transmits commands destined for the second microprocessor 210 and receives responses from it. These commands are designed to be recognized by the first microprocessor 110 as destined for the second microprocessor 210, as presented hereinbelow.

Such a mobile telephone 30 can also be used with the card 1 in FIG. 1.

Figure 3:
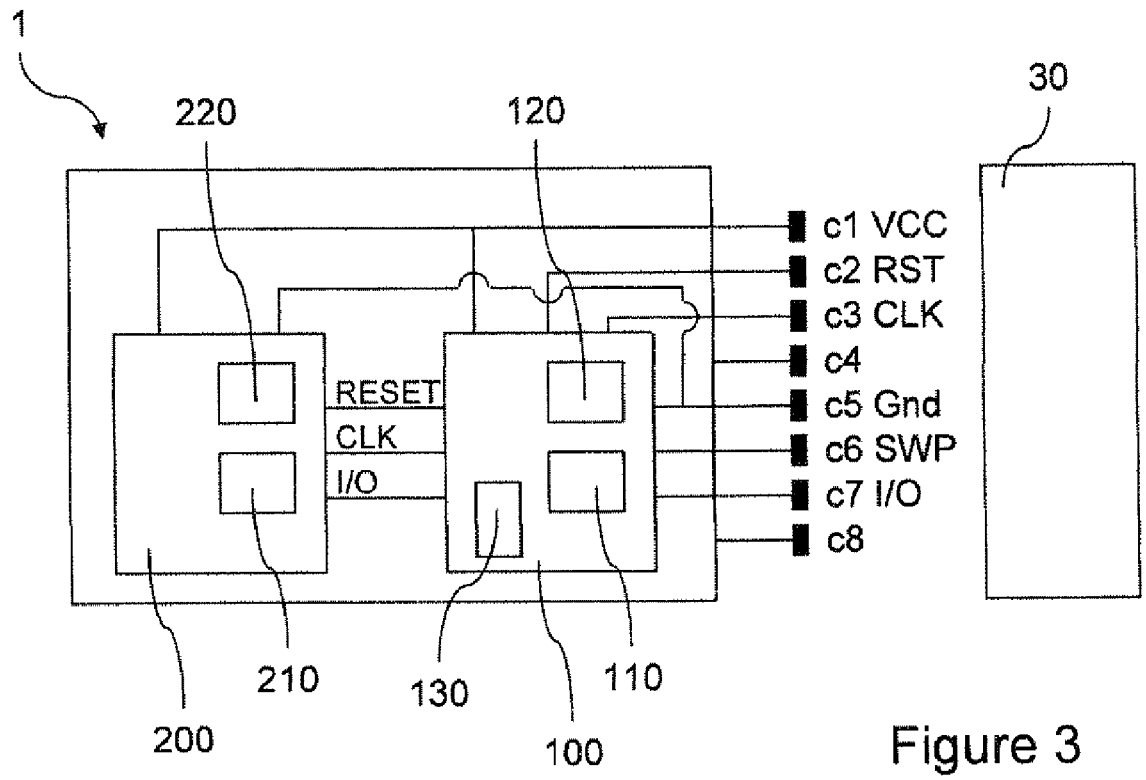
FIG. 3 shows a circuit diagram applicable to any one of the embodiments in FIGS. 1 and 2.

With reference to FIG. 3, the circuit diagram of the electronic module 10 in FIG. 1 or of the module 10 in conjunction with the microcircuit 200 in FIG. 2 is shown.

The eight electrical contacts c1 to c8 can be seen here, of which c1 (Vcc) and c5 (Gnd) supply the electrical power from the reader 30 to the components on the card.

The first contact, denoted "c1" in the ISO 7816 standard, is connected, via a first link, on the one hand to the first microprocessor 110 and, on the other, to the second microprocessor 210. This first contact c1 and this first link carry a DC voltage, generally denoted "Vcc", for powering the microprocessors 110 and 210 by the reader 30. It is noted here that the card 1 has no autonomous power supply. The contact c1 (combined with c5 hereinabove) thus allows the card 1 and its internal components to be powered.

The second contact, denoted "c2" in the ISO 7816 standard, is connected, via a second link, to the first microprocessor 110. This second contact c2 and this second link carry a reset signal, generally denoted "RST", for resetting the microprocessor 110.

The third contact, denoted "c3" in the ISO 7816 standard, is connected, via a third link, to the first microprocessor 110 and carries a clock signal, generally denoted "CLK", so that the reader 30 can drive the timing of the operation of the first microprocessor 110.

The fourth contact, denoted "c4" in the ISO 7816 standard, is not connected to either one of the microprocessors 110 and 210.

The fifth contact, denoted "c5" in the ISO 7816 standard, is connected, via a fifth link, on the one hand, to the first microprocessor 110 and, on the other, to the second microprocessor 210. This fifth contact c5 and this fifth link are connected to ground, generally denoted "GND", for the power supply of the microprocessors 110 and 210 by the reader 30.

The sixth contact, denoted "c6" in the ISO 7816 standard, is connected, via a sixth link, to the first microprocessor 110 and carries a data signal, here denoted "SWP", implementing the SWP protocol, or "single-wire protocol", for the communication of the first microprocessor 110 with the reader 30. It is noted that the reader 30 sends commands to the card 100 using, for example, this contact c6.

The seventh contact, denoted "c7" in the ISO 7816 standard, is connected, via a seventh link, to the first microprocessor 110 and carries data, generally denoted "I/O", so that the reader 30 and the first microprocessor can exchange data. It is noted that the reader 30 sends commands to the card 10 using, for example, this contact c7.

The eighth contact, denoted "c8" in the ISO 7816 standard, is not connected to either one of the microprocessors 110 and 210.

The input/output line I/O, clock line CLK and reset line RESET between the two microcircuits 100 and 200 can also be seen. In FIG. 2, these lines are carried by the conducting tracks 52.

In the microcircuit 100, aside from the application 120 executed by the microprocessor 110, a table 130 stored in memory is provided.

This table 130 lists all of the commands used by the application 120, here command1, command2, command3. With each of these commands is also associated the address for execution of the command. This is, for example, a pointer to the instruction or binary code to be executed for this command. Thus, when a search of this table is undertaken, as illustrated hereinafter, the first application is not penalized if the command sought is already in the list, then this command can be immediately executed thanks to this address.

This table 130 can notably be generated when the application 120 is compiled at its design stage, and delivered to the card 1 at the same time as this application.

Figure 4:
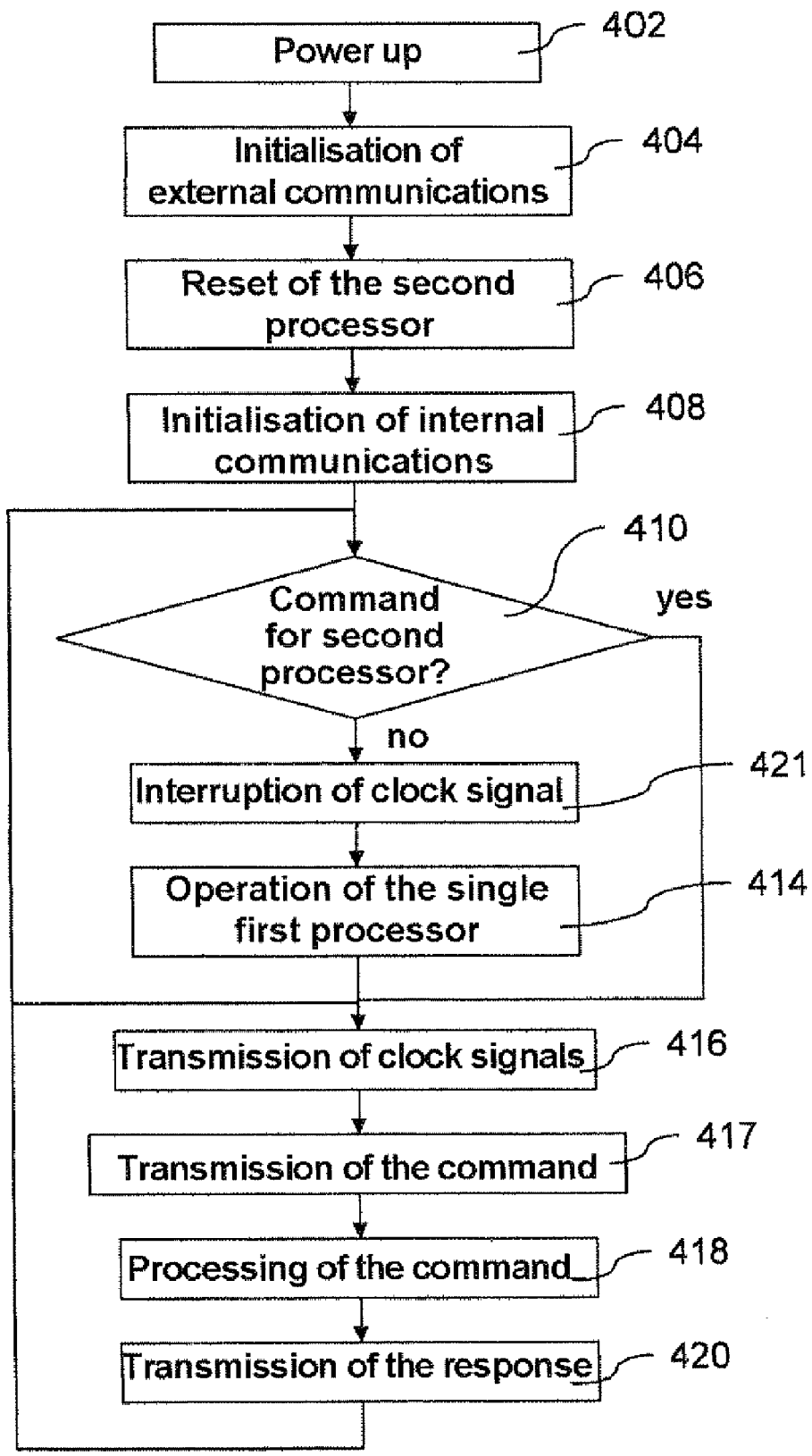
FIG. 4 shows, in the form of logic diagram, steps in one embodiment of the method according to the invention.

With reference to FIG. 4, the process of operation of the card 1 is now described. At step 402, the card 1 is powered up (and hence the microcircuits 100 and 200) by the reader 30. Then, during a step 404, the communication between the card 1 and the reader 30 is initialized according to the ISO 7816 standard.

During a step 406, the first microprocessor 110 sends a reset signal to the second microprocessor 210 together with a clock signal allowing it to drive the timing of the operation of the second microprocessor 210. In the embodiment described in FIG. 3, the first microprocessor 110 supplies a reset signal in a manner according to the ISO 7816 standard to the second microprocessor 210, this signal corresponding to the contact c2 in the ISO 7816 standard.

During a step 408, the microprocessors 110 and 210 initialize the communication between them. In the embodiment described and shown, this communication is carried out according to the ISO 7816 protocol. In this communication, the first microprocessor 110 behaves as a reader of the second microprocessor 210, with the exception of the supply of electrical power, which is provided directly via the contacts c1 to c5.

During a step 410, the first microprocessor 110 receives at least one command coming from the reader 30. This command forms part of a more general process which is described hereinafter with reference to FIGS. 6 and 7.

For example, this command is received by the card 1 on the contact 14 (c7) and complies with the ISO 7816 standard (this is an APDU command) or it is received by the contact 14 (c4 or c6) and complies with the SWP protocol. The first microprocessor 110 then determines whether it has received a command from the reader 30 destined for the second microprocessor 210 within a pre-determined period of time, for example the last five seconds.

For this purpose, the first microprocessor 110 determines whether the received command is intended for it before thus concluding, if this is not the case, that this is a command destined for the second application 220.

For this purpose, several embodiments may be implemented in order for the first microprocessor 110 to determine whether it is the intended destination of a command.

According to one embodiment, all the commands arriving on the same contact 14, for example the contact c4 which is connected to the very-short-range communications interface 320-330 (FIG. 2), are destined for the second application 220 (or, as a variant, for the first application 120).

In this case, the microprocessor 110 or the application 120 detects the contact terminal 14 over which the command arrives and directly determines whether this command is intended for it or not.

The first application 120, preponderant in the card 1, may also be designed to incorporate the means of communication capable of receiving data from the interfaces 14. Thus, these means allow the first application 120 to know on which contact the command is received.

As a variant, means of communication receiving the data on the contacts 14 may be separate from the first application 120. When the received command is transmitted to the first application, information on the contact number receiving the command can be added in order to enable this application to determine this contact number by simply reading the information.

As a variant, the first application can detect the protocol or the standard used for transmitting the commands in order to determine the communications channel.

In detail, taking the example hereinabove, if the first application detects an APDU command, it deduces from this that the contact c7 has received this command and hence that, for example, the first communications channel is used. In contrast, if a command according to the SWP protocol is received, the first application deduces from this that it has been received on the contact c4 and hence, for example, by the second channel.

The association (contact, protocol or standard) can be carried out and stored during an initialization phase of the card 1.

According to another embodiment, which, as such, is separately the subject of another patent application submitted by the same applicant, and which implements the table 130, the first microprocessor 110 extracts the received command.

It then searches through the file with the table 130 stored in memory to check whether the received command is in the list. For example, it can extract each of the commands that are listed in it and then carry out a comparison of each of these commands with that received.

The comparison can be halted as soon as a comparison is positive, in which case the first microprocessor 110 concludes that it is the destination of the command: the determination is positive. The first application 120 then executes the received command.

If, at the end of the comparison with all of the commands listed, no comparison is positive, the first microprocessor 110 concludes that the command is not destined for it, and hence that it is destined for the other application 220: the determination is negative. The command is then transmitted to the second application 220r as seen hereinafter, for potential execution.

It is noted here that, if more than two applications are executed in the card 1, a hierarchy of the applications is preferably established. By convention, a main application of highest level and applications of lower rank are considered. The establishment of this hierarchy allows, in the case of a negative determination, the received command to be transmitted to the application of lower rank. Of course, in the case of a positive determination for an application, the latter executes said command without transmitting it to another application.

Accordingly, from iteration to iteration, the received command is transmitted from application to application until it reaches the destination application that executes it without retransmitting it to its lower level application.

According to yet another embodiment, as such, is separately the subject of another application submitted by the same applicant, no table 130 is used. In this embodiment, the executable code of the first application 120 comprises conditional instructions. Thus, each instruction provided within the code is preceded by a test function applied to the command to be executed; for example, the function if received command=command1 then execution of the instruction command1 else.

The tests may be designed to follow one another for each of the commands of the first application; explicitly:
if received command=command1 then execution
else if received command=command2 then execution
else . . .
else if received command=command N then execution
else negative determination.

It is noted that several tests may be grouped within one and the same if loop by using the OR operator between equalities.

In particular, the program may be designed to only perform one if operation by grouping, by means of OR operators, the equalities received command=command i within one and the same if loop.

In this embodiment, the last if loop is exited via the else path only in the case of a negative determination.

Thus, either the command is executed in the case of a verified equality without one of the conditions, or the command is transmitted to the second application 220 by way of the else branch of the last if loop, which then comprises an instruction to transmit the command to this application 220.

According to yet another embodiment, the use of the table 130 is combined with the use of the conditional instructions. In particular, the determination using the table 130 is firstly carried out and, subsequently, by means of the conditional instructions.

If the table 130 is correctly generated, the conditional instructions are only used to confirm that the received command really is intended for the first application 220. On the other hand, if the table 130 is corrupted, the conditional instructions afford an additional protection for the first application 220 against an execution malfunction (bug).

According to yet another embodiment, the detection of the contact 14 receiving the command in order to transmit it to the second application 220 can be combined with a check, for example if the contact would not allow an immediate decision to be taken (for example contact 14 used for both applications) with the aid of the table 130 and/or conditional instructions implemented within the executable code of the first application 120.

Thanks to these dispositions, specific contacts 14 may be readily used for certain applications and other contacts 14 dedicated to the two applications.

If the first microprocessor 110 has not received any command from the reader 300 destined for the second microprocessor 210 (hence no negative determination) during the pre-determined time period, the first microprocessor 110 interrupts the clock signal destined for the second microprocessor 210 and the latter goes into standby, during a step 412. This step 412 can readily be implemented by the first microprocessor 110 using a timer that counts the clock signals until a pre-determined number is reached and which then generates an interruption interrupting the transmission of the clock signal to the second microprocessor 210.

It is noted that, in the case where the second microprocessor 210 comprises means for going into standby in the absence of a clock signal, the inhibition of the clock signal transmitted by the first microprocessor 110 to the second microprocessor 210 allows the power supplied by the reader to be saved, which can be particularly critical when the reader is in a portable device powered by a battery, such as a mobile telephone. In some variants, the first microprocessor 110 can instruct part of the second microprocessor 210 to go into standby. The first microprocessor 110 then operates in a manner known to those skilled in the art, for example as a SIM card in the framework of a mobile telephony application, during a step 414, and periodically returns to step 410. During step 414, the first microprocessor executes each command destined for it and returns at least one response to the reader 30.

If, during a step 410, the first microprocessor determines that it has received at least one command from the reader 30 destined for the second microprocessor 210 (hence negative determination), the first microprocessor 110 sends the clock signal to the second microprocessor 210 and the latter goes back into operation, during a step 416. It is noted that for certain types of microprocessors and standby command modes, during step 416, where necessary the first microprocessor 110 sends a reset command to the second microprocessor 210.

During a step 417, the first microprocessor 110 transmits, to the second microprocessor 210, each command destined for the second microprocessor 210.

As a variant, the first microprocessor 110 generates commands for the second microprocessor 210 that are based on several commands received from the reader 30. As a variant, the first microprocessor 110 generates commands for the second microprocessor 210 that are based on at least one command received from the reader 30 and on information stored in the associated memory 120.

The second microprocessor 210 then processes this command, for example of the APDU type according to the ISO 7816 standard, and returns a response to the first microprocessor 110, destined for the reader 300, during a step 418.

By way of example and as illustrated in more detail hereinafter with reference to FIGS. 6 and 7, the processing step can form part of an authentication procedure based on "challenge/response" for which the second microprocessor 210 calculates a numerical data value, starting from a random data value received with the command and using a symmetrical key stored in memory. Ad hoc cryptographic means, for example software means, are then provided within the second microcircuit 200 and a key stored in a memory of the microcircuit 200.

Then, during a step 420, the first microprocessor 110 sends a response received from the second microprocessor 210 to the reader 30 and returns to step 410. This response is notably relayed by the first microprocessor 110 to the communications contacts 14. This step is notably presented in more detail hereinafter with reference to FIGS. 6 and 7.

The present invention thus allows the two types of applications to be made to co-exist on the same card and the applications with moderate security requirements to be readily updated, without having to get the applications with high security demands re-certified and without modifying the latter.

Figure 5:
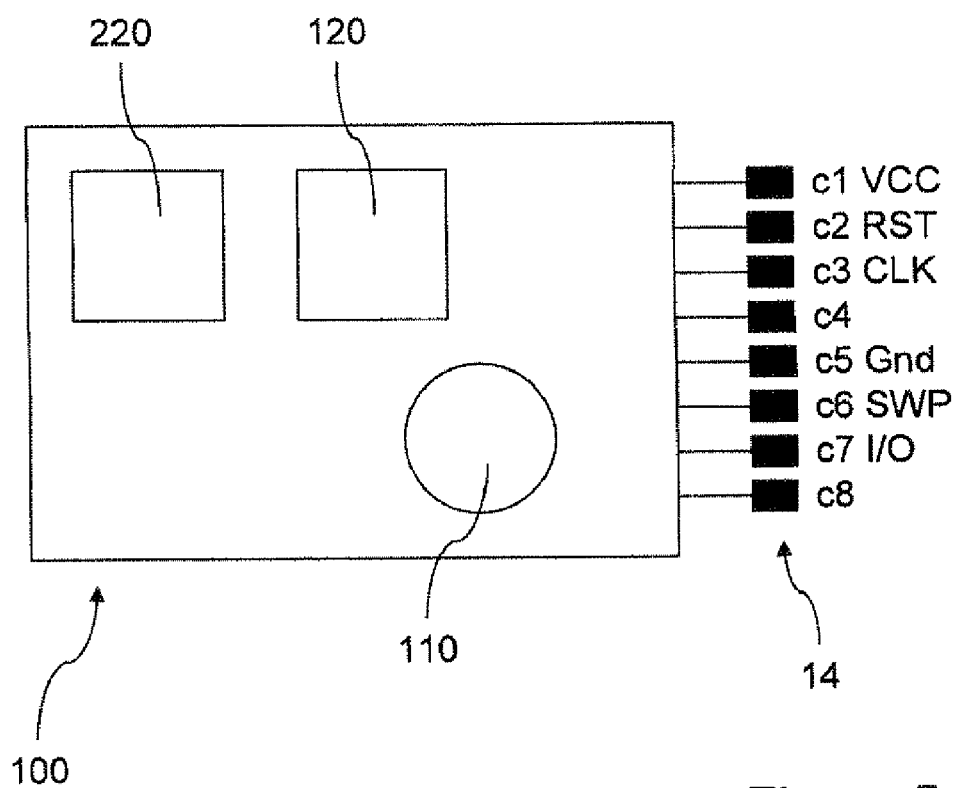
FIG. 5 shows schematically a third embodiment of the invention.

In FIG. 5, an embodiment of the invention based on only one microcircuit 100 can be seen.

The microcircuit 100 (carried by a card body not shown) has a single multi-tasking microprocessor 110 for the execution of the two applications 120 and 220.

The principles stated previously are applicable to this embodiment, notably the use of the table 130, of the conditional instructions, and of a contact 14 dedicated to the second application.

The communications and controls between the two applications 120 and 220 are then solely effected via software application channels.

Figure 6:
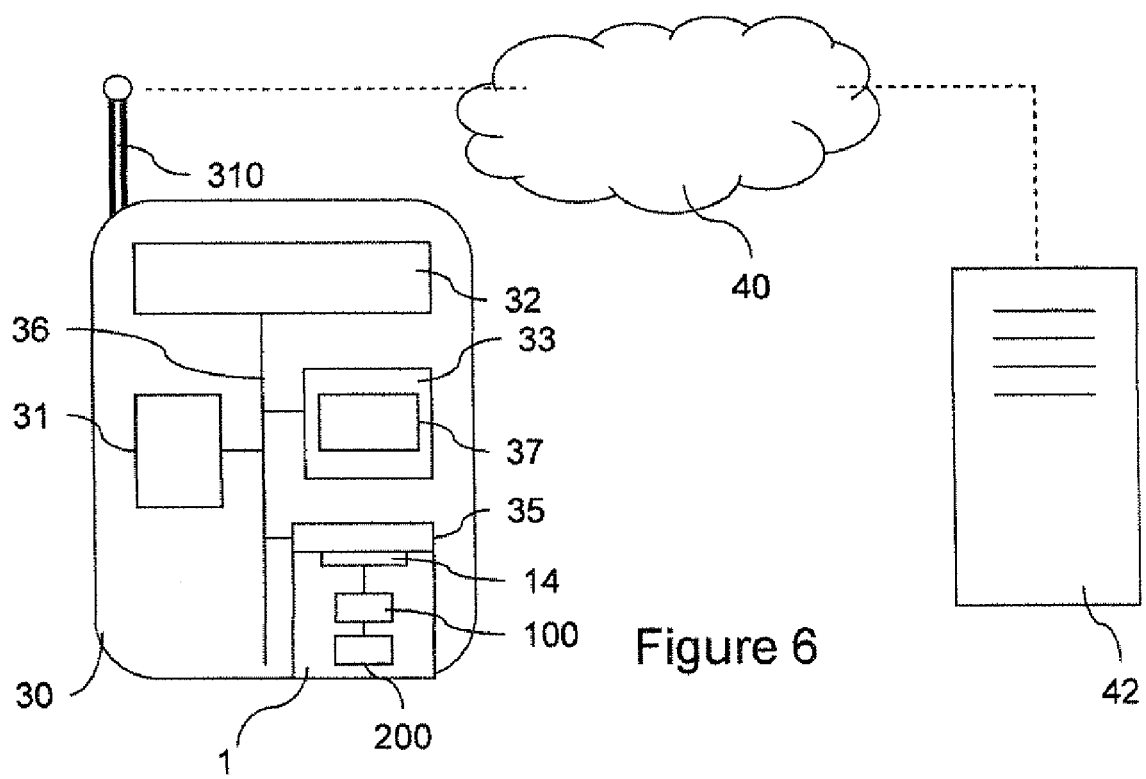
FIG. 6 shows schematically an overall system in which a card according to the invention is implemented.
Figure 7:
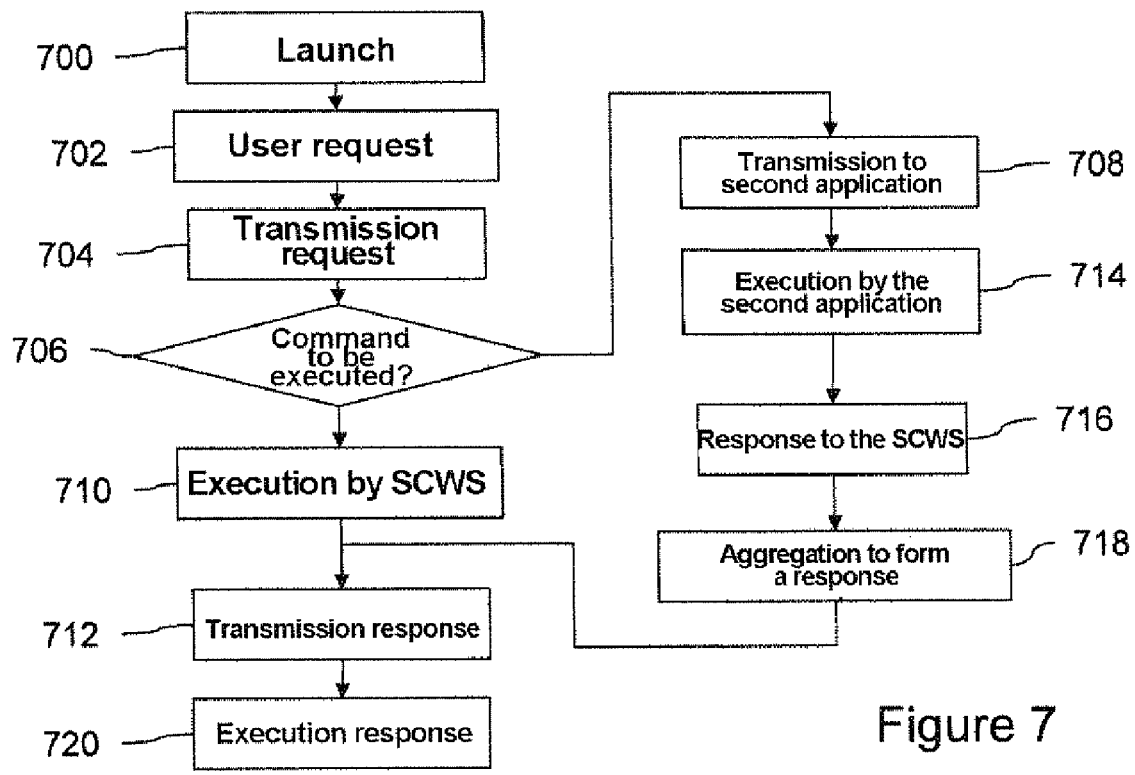
FIG. 7 shows, in the form of a logic diagram, steps in an exemplary operation of the system in FIG. 6.

With reference now to FIGS. 6 and 7, a banking application implementing the invention is described.

The mobile telephone 30, reader of the smartcard 1, is again seen here.

The mobile telephone 30 possesses operational components, notably a CPU (Central Processing Unit) 31, a display screen 32, one or more memories 33, for example a ROM and a RAM memory, means of communication 34 with the mobile telephony network 40 and an interface 35 with a SIM card 1 at the electrical contacts 14.

These components are interconnected by means of a data bus 36.

The CPU 31 is capable of executing applications contained in memory 33, an onboard operating system (not shown) that notably enables the mobile telephone to be operated in the conventional manner.

The memory 33 also comprises a known application of the Web browser type 37, executable by the CPU 31, in order to allow the user to access a remote Internet network, for example via the aforementioned WAP protocol. A keyboard or input device (not shown) provided on the mobile telephone 30 allows the user to interact with the web browser 37 when the latter is executed by the CPU 31. The return information supplied by the web browser 37 is displayed on the screen 32 of the telephone 30.

The card 1 and the components of the telephone 30, notably the browser, communicate via the OMA (Open Mobile Alliance) standard OMA-TS-Smartcard_Web_Server-V1.

The first application 120 is a smartcard server, for example a web server ("SmartCard Web Server") and the microcircuit 100 stores web pages in memory.

The second application 220 is an electronic cash application.

With reference to FIG. 7, a user wishing to check his electronic cash balance and, as the case may be, to top it up is now described.

At step 700, the user launches the web browser 37 which then initiates an execution context proper and displays a home web page for managing the cash facility.

At step 702, the user selects an action from the page displayed, for example he clicks a link "check balance".

At step 704, the browser 37 sends an HTTP request to the server SCWS 120 according to the user request. This HTTP request can notably comprise a function "check_balance" which is implemented by the application 220 of the cash facility.

At step 706, the server SCWS 120 receives the request and determines whether the received command "check_balance" is intended for it, according to one of the aforementioned mechanisms in relation to FIG. 4.

At step 708, the server 120 has determined that the command must be transmitted, and therefore transmits it to the application 220. Notably, the server 120 converts the command "check_balance" into an APDU command destined for the second application 220. The use of a conversion table may for example be envisioned in order to convert at least a part of the command received via HTTP request (and in a general manner, according to any protocol, for example SWP) into an APDU command destined for the second application 220.

It is noted that, if the command were destined for the server 120, then the latter would have executed it (step 710) and would have sent the result, i.e. an HTTP response, for example a new HTML page, to the browser (step 712).

Following the transmission, at step 714, the cash application 220 executes the command. In the case in question, the application determines the value of the cash balance remaining in the account as a function of historical transaction data (credits and debits) recorded in memory in the microcircuit 200.

At step 716, the second application 220 returns the balance calculated to the web server 120.

At step 718, the web server 120 incorporates the balance obtained into an HTML page, a model of which is in memory in the first microcircuit. This model can for example contain additional data associated with the telephony service provider for the SIM card 1, notably a logo or user information such as his telephone number. The web server 120 thus forms an HTTP response that it transmits to the browser 37 at step 712.

At step 720, the browser 37 executes the HTTP response, in the present case it displays the HTML page containing the balance and the logo on the screen 32 of the telephone.

Later on, the user wishes to top up his cash facility 220 online, by using the remote banking server 42.

On the homepage for managing the cash facility, he clicks a link "top up cash facility".

An HTTP top-up request is sent to the SCWS server 120 as in step 704. This request comprises calling up a function initAuthent implemented by the SCWS server 120, for example:

---

<a href="http://microcircuit2/initAuthent>top up cash facility </a>

---

Via steps 706, 710, 712 and 720, a page having the function of verifying a secret code is generated and displayed on the screen 32:

---

<FORM action="verifyCode" method="post" name=BankingCode
Enter your personal code
<INPUT type="password" name="Code" maxLength="4">

---

The user then inputs his personal code into the form displayed by the browser 37 and validates the form, which transmits an HTTP request to the server SCWS 120 (step 704).

The server 120 determines at step 706 that the command is a function "verifycode" which is implemented by the cash facility application 220.

After transmission (step 708), the code is checked (step 714) by the cash facility application. If the code is good, the SIM card 1 initiates a connection (for the transaction) with the banking server 42 by generating an HTTP response to the request (steps 718 and 712) on the basis of an identifier supplied by the cash facility application and of the code input and encrypted by an encryption key (step 716). The response contains the following HTML page. The browser 37 executes and displays (step 720) this page to the user on the screen 32:

```
<HTML>
    <HEAD>
        <TITLE>PIN correct</TITLE>
        <META http-equiv="Refresh" content=
        "1;
    URL=https://www.mybank.com/HomeBanking.cgi?code=123"
    >
    </HEAD>
    <BODY>
        Please wait, verification in progress...
    </BODY>
</HTML>
```

It is noted here that the meta-data identified by the marker <META> comprises an automatic redirection, here after content=1 second, toward the address of the banking server 42, here https://www.mybank.com/HomeBanking.cgi?id=123; code-85FE6EE 9, via a secure channel. The identifier 123 and the code input and encrypted 85F6EE9 are transmitted as parameters. Thus, at the end of this delay time of 1 second, the browser transmits an HTTP request to the address previously specified, here the banking server 42 and its main page.

Various steps of an authentication procedure are thus carried out between the cash facility application 220 and the banking server 42, based on a redirection mechanism within the browser 37.

Once the authentication has been carried out, identical and/or conventional mechanisms are used in order to allow the user to effectively top up his cash facility.

The preceding examples are only exemplary embodiments of the invention to which it is not limited.

The invention claimed is:

1. Smartcard comprising:
a first microprocessor and a second microprocessor separate from the first microprocessor, the first microprocessor having a level of security that is lower than that of the second microprocessor;
an interface of electrical contacts for receiving and transmitting commands from and to outside the smartcard through one of a first and a second communications channel, said interface of electrical contacts comprising separate electrical contacts for each of the first and second communications channels;
means for communicating all said commands to and from outside the smartcard on the first and second communications channels through said first microprocessor;
the first microprocessor comprising means for determining whether the commands from outside the smartcard are on the second communications channel and for communicating these commands to the second microprocessor only in the case of a positive determination; and
communication means for communicating to and from the second microprocessor through the first microprocessor and the ones of the electrical contacts associated with the second communications channel,
wherein the ones of the electrical contacts associated with the second communication channel contact a wireless communications interface of a contact reader device adapted to receive the smartcard.

2. Smartcard according to claim 1, wherein the means for determining detect the electrical contact or contacts receiving said command.

3. Smartcard according to claim 2, wherein said electrical contacts are exclusively connected to the first microprocessor.

4. Smartcard according to claim 1, wherein said communication means implement an SWP (acronym for "Single Wire Protocol) communications protocol on the second communications channel to communicate with the wireless communications interface.

5. Smartcard according to claim 4, wherein the first microprocessor comprises conversion means for converting the received command received on the second communications channel from the SWP to a command format compatible with said second microprocessor.

6. Smartcard according to claim 5, wherein the command format compatible with the second microprocessor is the ISO 7816 protocol.

7. Smartcard according to claim 1, wherein the first and the second microprocessors respectively execute a first and a second application stored in the card.

8. Smartcard according to claim 1, further comprising at least one input/output line which connects the two microprocessors and is used for transmitting the command received on the second communications channel from the first microprocessor to the second microprocessor.

9. Smartcard according to claim 8, further comprising a clock link that connects the two microprocessors in such a manner that said first microprocessor supplies a clock signal to the second microprocessor.

10. Smartcard according to claim 9, wherein the first microprocessor comprises means for inhibiting said clock signal supplied to the second microprocessor.

11. Smartcard according to claim 1, wherein said first microprocessor implements an application for identifying a subscriber to a mobile telephony network according to a mobile telephony standard.

12. Device comprising a smartcard according to claim 1.

13. Device according to claim 12, further comprising:
the contact reader device that communicates with the smartcard through the interface of electrical contacts, and
a short-range said wireless communications interface connected to said contact reader.

14. Device according to claim 13, wherein the wireless communications interface complies with the Near Field Communication standard.

15. Smartcard according to claim 1, wherein the first and second communications channels implement different protocols and wherein the means for determining determine the communication channel of a received command by detecting the protocol used to transmit the received command.

16. Smartcard according to claim 1, wherein the first microprocessor places, based on an amount of received commands on the second communications channel, the second microprocessor into a standby state in which operation of the second microprocessor is inhibited by interrupting a clock signal supplied by the first microprocessor to the second microprocessor.

17. Smartcard according to claim 16, wherein the first microprocessor interrupts the clock signal when the first microprocessor has not received a command for the second microprocessor during a pre-determined time period.

18. Smartcard according to claim 17, wherein, following the pre-determined time period, the first microprocessor supplies the clock signal to the second microprocessor as soon as the first microprocessor determines that a new command for the second microprocessor has been received on the second communications channel, thereby placing the second microprocessor in operation.

19. Smartcard according to claim 1, wherein the second microprocessor communicates with a reader external to the contact reader device, by using the wireless communications interface equipping the contact reader device and by accessing the wireless communications interface through the one of the electrical contacts associated with the second communications channel.

20. Method for executing a command by a smartcard that includes a first and a second microprocessor, the second microprocessor being separate from the first microprocessor, the method comprising:

implementing in the first microprocessor a level of security that is lower than that of the second microprocessor;

at a contact reader device outside of the smartcard, receiving the smartcard and communicating commands to and from the smartcard;

communicating, through an interface of electrical contacts of the smartcard, the commands to and from the contact reader device on one of a first and a second communications channel, the interface of electrical contacts including separate electrical contacts for each of the first and second communications channels, all of the commands to and from outside the smartcard being communicated through the first microprocessor;

for each said command from outside the smartcard, the first microprocessor determining whether the command is on the second communications channel;

only in the case of a positive determination, communicating the received command to the second microprocessor, wherein the second communications channel is dedicated for communication to and from the second microprocessor through the first microprocessor and ones of the interface of electrical contacts associated with the second communications channel, and wherein the ones of the interfaces of electrical contacts associated with the second communications channel contact a wireless communications interface of the contact reader device receiving the smartcard.

\* \* \* \* \*